(12) United States Patent
Chen et al.

(10) Patent No.: US 9,939,792 B2
(45) Date of Patent: Apr. 10, 2018

(54) SYSTEMS AND METHODS TO ADAPTIVELY SELECT EXECUTION MODES

(71) Applicant: Futurewei Technologies Inc., Plano, TX (US)

(72) Inventors: Liya Chen, San Jose, CA (US); Chen Tian, Union City, CA (US); Ziang Hu, Union City, CA (US)

(73) Assignee: Futurewei Technologies, Inc., Plano, TX (US)

( * ) Notice: Subject to any disclaimer, the term of this patent is extended or adjusted under 35 U.S.C. 154(b) by 555 days.

(21) Appl. No.: 14/585,738

(22) Filed: Dec. 30, 2014

(65) Prior Publication Data

US 2016/0187861 A1    Jun. 30, 2016

(51) Int. Cl.
*G06N 99/00* (2010.01)
*G05B 13/02* (2006.01)

(52) U.S. Cl.
CPC ......... *G05B 13/027* (2013.01); *G06N 99/005* (2013.01)

(58) Field of Classification Search
CPC .................................................. G06N 99/005
See application file for complete search history.

(56) References Cited

U.S. PATENT DOCUMENTS

| | | |
|---|---|---|
| 2004/0268354 A1 | 12/2004 | Kanai et al. |
| 2006/0053334 A1 | 3/2006 | Ingen et al. |
| 2011/0247003 A1* | 10/2011 | Fong ..................... G06F 9/5061 718/104 |

FOREIGN PATENT DOCUMENTS

| | | |
|---|---|---|
| CN | 102135906 A | 7/2011 |
| CN | 102360312 A | 2/2012 |
| CN | 102609978 A | 7/2012 |
| CN | 103034534 A | 4/2013 |

OTHER PUBLICATIONS

S. Russell and P. Norvig, Artificial Intelligence: A Modern Approach, 2nd Ed., 2003, pp. 649-789.*
"International Application Serial No. PCT/CN2015/097905, International Search Report dated Mar. 23, 2016", 6 pgs.
"International Application Serial No. PCT/CN2015/097905, Written Opinion dated Mar. 23, 2016", 4 pgs.

* cited by examiner

*Primary Examiner* — Vincent Gonzales
(74) *Attorney, Agent, or Firm* — Schwegman Lundberg & Woessner, P.A.

(57) ABSTRACT

Methods and systems that facilitate efficient and effective adaptive execution mode selection are described. The adaptive execution mode selection is performed in part on-the-fly and changes to an execution mode (e.g., sequential, parallel, etc.) for a program task can be made. An intelligent adaptive selection can be made between a variety execution modes. The adaptive execution mode selection can also include selecting parameters associated with the execution modes. A controller receives historical information associated with execution mode selection, engages in training regarding execution mode selection, and adaptively selects an execution mode on-the-fly. The training can use an approach similar to an artificial neural network in which automated guided machine learning approach establishes correspondences between execution modes and task/input feature definitions based upon historical information. An adaptive selection is performed on-the-fly based on an initial trial run.

20 Claims, 9 Drawing Sheets

300

310

Gathering information associated with definition of task feature sets, input feature sets, and heuristics associated with execution mode selections.

320

Associating definition characteristics to execution modes by performing training including guided machine learning.

330

Implementing adaptive selection of an execution mode on the fly including trial running, solution selection and starting real run utilizing a selected execution mode.

510
Launching a trial version task.

520
Collecting features from the trail version task.

530
Selecting one of the execution modes in a feed forward procedure with calculations in real time.

540
Initiating running of processes under the one of the execution modes.

FIG 5

SYSTEMS AND METHODS TO ADAPTIVELY SELECT EXECUTION MODES

TECHNICAL FIELD

The present disclosure relates generally to the field of processing procedures and execution modes (e.g., sequential, parallel, etc.).

BACKGROUND

Numerous electronic technologies such as digital computers, calculators, audio devices, video equipment, and telephone systems facilitate increased productivity and cost reduction in analyzing and communicating data, ideas and trends in most areas of business, science, education and entertainment. Frequently, these activities involve complex and complicated processing and how the information is processed (e.g., sequentially, in parallel, etc.) can impact performance. Conventional process or task execution is typically limited to one of a couple of pre-determined execution modes (e.g., sequential and parallel).

Different execution modes typically have different advantages and potential problems. Sequential programming is one of the original execution modes and is still used in many applications. Sequential programming is relatively straight forward, well understood and since the programs generally flow in a straight sequence, sequential programming does not usually involve complex timing coordination between different parts of the program. However, sequential programming is usually limited to performing one task at a time and can take a significant amount of time to complete the whole program. Parallel computing offers performance improvement in some applications by performing various operations substantially at the same time and has become one of the dominant paradigms in computer architectures (e.g., in multi-core processors, etc.) due to massively increased network size and attempts to solve increasingly difficult problems. While parallel computing can be beneficial in many applications, there are various aspects of parallel programming that can also be problematic and give rise to significant obstacles (e.g., more communication between components, synchronization between tasks, race conditions, usually more difficult to develop than sequential programming, etc.).

There are some conventional framework approaches, however, they typically have limitations such as limited to choosing one pre-determined framework at a time with a fixed execution mode. Once a pre-determination is made, the execution mode is not typically changed. The performance ability of a particular fixed pre-determined execution mode can vary under different circumstances (e.g., problem size, data arrangement, cache usage, etc.). Some traditional attempts try to extract parallelism, but often require added runtime and operating system (OS) extensions. There are a few other conventional approaches that use machine learning to map heuristic decisions, but these attempts are usually limited to pre-determination in compiler based auto-parallelization attempts that are often problematic (e.g., hard to handle irregular programs, do not adapt to input type, etc.).

SUMMARY

Methods and systems that facilitate efficient and effective adaptive execution mode selection are described. In one embodiment, a system comprises: a plurality of execution units; a memory; and a controller embedded in a processing component coupled to the memory and coupled to the plurality of execution units, wherein the controller is operable to direct execution mode selection with respect to said plurality of execution units. The controller is further operable to: engage in definition operations; establish a plurality of definition pairs that map definition characteristics to execution modes by performing guided machine learning based training; and execute adaptive selection of an execution mode on-the-fly while running in real time. In one exemplary implementation, a method executed by a controller comprises: gathering information related to a plurality of execution units controlled by said controller; associating definition characteristics to execution modes by performing training including performing guided machine learning; and performing adaptive selection of an execution mode; and initiating a real run utilizing a selected execution mode. The adaptive selection is performed on-the-fly. One exemplary system comprises: a learning module configured to receive information; an execution module configured to run trials and select an execution mode of a plurality of execution modes, wherein the execution module is further configured to select the execution mode on-the-fly while running in real time using artificial neural networks; and a running module coupled to the execution module and configured to initiate running of tasks based upon a selected execution mode from the execution module.

BRIEF DESCRIPTION OF THE DRAWINGS

The accompanying drawings, which are incorporated in and form a part of this specification, are included for exemplary illustration of the principles of the present invention and not intended to limit the present invention to the particular implementations illustrated therein. The drawings are not to scale unless otherwise specifically indicated.

FIG. 3 is a flow chart of exemplary execution mode selection process or method in accordance with one embodiment.

FIG. 5 is a flow chart of an adaptive selection process in accordance with one embodiment.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Further-more, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Methods and systems that facilitate efficient and effective adaptive execution mode selection are described. The adaptive execution mode selection is performed in part on the fly and involves changes to an execution mode. An intelligent adaptive selection of a program task can be made between a variety of execution modes (e.g., sequential, parallel, etc.). The adaptive execution mode selection can also include selecting or choosing parameters associated with the execution modes.

In one embodiment, a controller receives historical information associated with execution mode selection, engages in training regarding execution mode selection, and adaptively selects an execution mode on-the-fly. The historical information can include information defining or describing features of a program task and inputs. The training can use an approach similar to an artificial neural network in which an automated guided machine learning approach establishes correspondences between execution modes and task/input feature definitions based upon the historical information. The training operations provide guidance for determining a preliminary execution mode selection (and also parameter selection where applicable) for use in a trial run. An adaptive selection is performed on-the-fly based on the trial run. Additional task feature information and input feature information gathered during the trial run is utilized by the controller in a feed forward procedure (e.g., with calculations in real time, etc.) which results in an adapted execution mode selection under current system conditions. The adapted execution mode selection is utilized for continued run time operations. Additional information can be collected from the continued run time operations and used to make changes or updates to the adapted execution mode selections.

Figure 1:
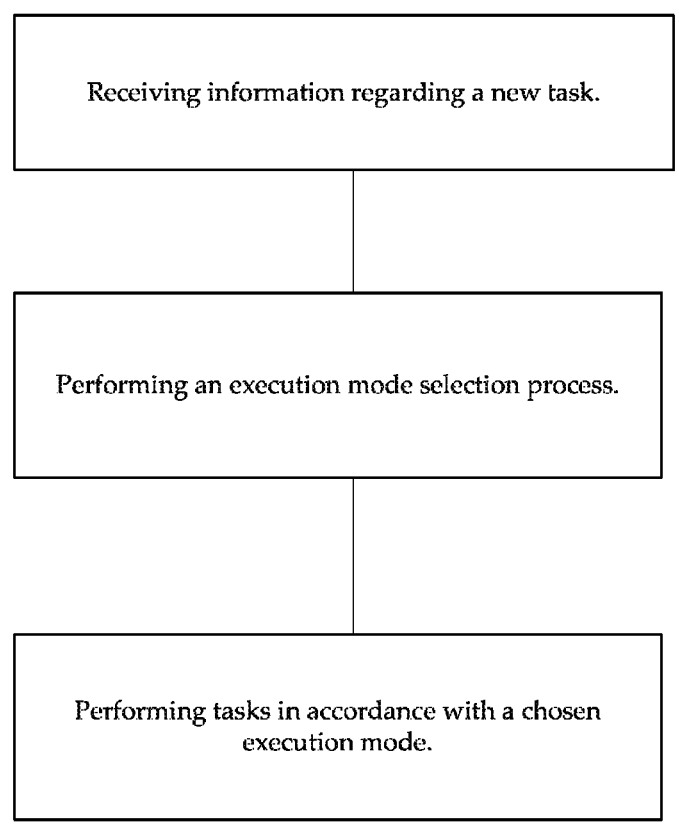
FIG. 1 is a flow chart of an exemplary process in accordance with one embodiment of the present invention.

FIG. 1 is a flow chart of a process 100 in accordance with one embodiment of the present invention. Process 100 includes selecting an execution mode to use for performing tasks. Selection of an execution mode is made on-the-fly in real time. A general overview of the operations of exemplary approaches are initially presented and additional explanation of new adaptive execution mode selection approaches is set forth in later portions of the detailed description.

In block 110, information regarding a new or current task or program is received. The information can include information associated with performing the task (or program) and information associated with inputs to the task. It is appreciated that various types of information can be received.

In block 120, an adaptive execution mode selection process is performed. In one embodiment, historical information regarding task feature definitions and input feature definitions is gathered and an artificial neural network type training is performed utilizing a guided machine learning approach. A task is initiated in a trial run using a preliminary execution mode selection that is based upon artificial neural network training results. Additional current task feature information and current input information is collected from the trial run and utilized to make or engage in a real run with an adapted execution mode selection.

In block 130, tasks are performed in accordance with a real run using an adapted execution mode. It is appreciated that a variety of applications or programs can be performed. In one exemplary implementation, additional adaptive execution mode selection operations can be initiated "again" (e.g., after a particular period of time, a trigger event, etc.) to determine if a change in the execution mode selection is appropriate.

Figure 2:
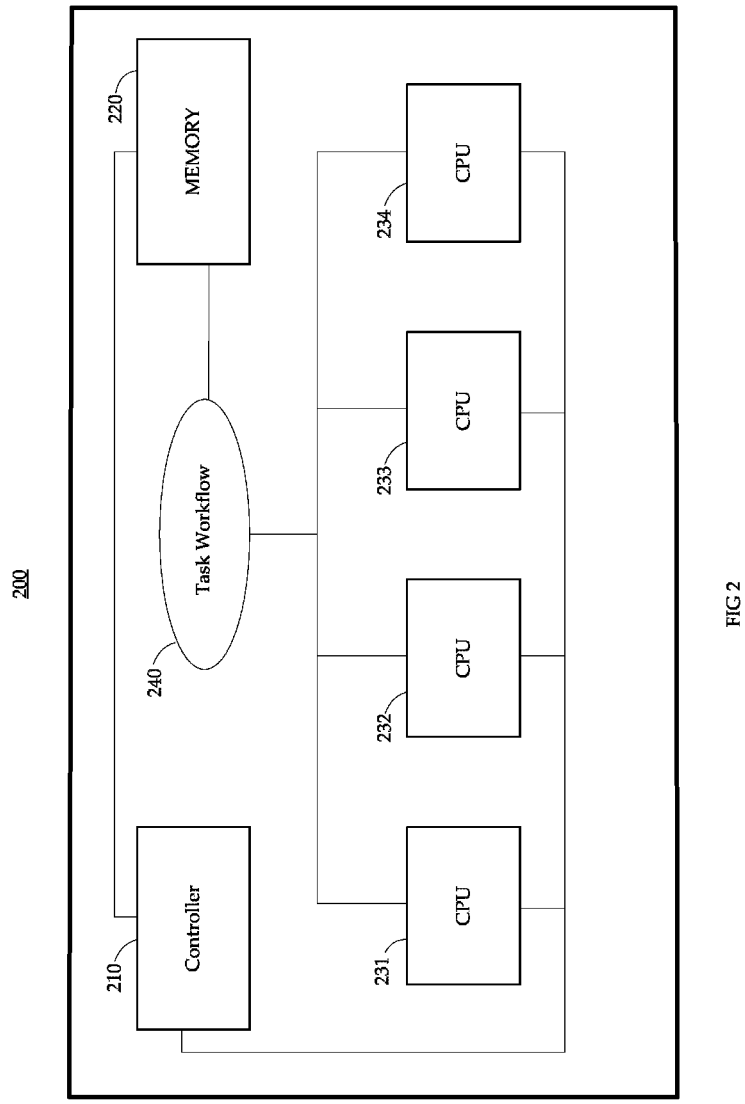
FIG. 2 is a block diagram of system in accordance with one embodiment.

FIG. 2 is a block diagram of system 200 in accordance with one embodiment of the present invention. Execution mode selection system 200 includes controller 210, memory 220, and central processing unit cores 231, 232, 233 and 234. Central processing unit cores 231, 232, 233 and 234 perform processing operations associated with various tasks. Controller 210 directs the execution mode and parameter selection for the processing operations performed by the central processing unit cores 231, 232, 233 and 234. In one embodiment, controller 210 also includes a processing circuit that performs operations associated with the execution mode selection. Memory 220 stores information for the controller 210 and central processing unit cores 231, 232, 233 and 234.

In one embodiment, system 200 is arranged in an integrated circuit (or component) and controller 210 is embedded in the integrated circuit and is coupled to the memory 220. The controller directs execution mode selection. The mode selection can include various execution modes (e.g., sequential, parallel, etc.) and also parameters associated with a selection mode. Controller 210 engages in various definition operations including collecting information (e.g., related to task features, input features, heuristics associated with execution mode selection, etc.). The input then performs training operations directed at learning preferred mode selections for various feature definitions (e.g., task feature definitions, input feature definitions, etc.). The training operations can include neural network type operations with guided machine learning. Based upon results of the training, the controller can execute execution mode selection, including: launching a trial version task; collecting features from the trial version task; selecting an adapted execution mode in a feed forward procedure (e.g., with calculations in real time); and initiating real running of processes utilizing the adapted execution mode selection.

FIG. 3 is a flow chart of exemplary execution mode selection process 300 in accordance with one embodiment. Mode selection process 300 is analogous to the execution mode selection process performed in block 120. The execution mode selection process 300 includes a mechanism to choose which execution mode (e.g., sequential, parallel, etc.) to utilize in running a program or performing a task. If a parallel execution mode is chosen, the execution mode selection process can also choose what parameters to use with the selected parallel execution mode.

In block 310, an information gathering process is performed. The information gathering process can include gathering historical information (e.g., collected from previous runs of similar tasks). The information can include information associated with a definition of task feature sets, input feature sets, and heuristics associated with execution mode selections. The heuristics can include an algorithm or set of process steps which select an execution mode for an application or program. In one exemplary implementation, a feed forward neural network set of process steps select an execution mode based upon summation of weighted correspondence between features characteristics (e.g., from task feature sets, input feature sets, etc.) and various execution modes. The task features definition can include a number of elements that define or describe features or characteristics of a task (e.g., the number of instructions included in the task, a number of task parameters associated with a task, a time of execution, an amount of memory usage by the task, etc.). The definition of input features can include a number of elements that define or describe features or characteristics of the inputs (e.g., length or size of an input, an input type, a dimension of input data, etc.).

In block 320, a learning process is performed. In one embodiment, definition information is associated with execution modes. An embedded controller can utilize a feed-forward artificial neural network approach which includes pre-training using information from block 310 and supervised machine learning mechanisms. In one embodiment, training samples are collected from historical runs and the training samples include pairs of input and output. Each pair of a training sample has two parts: the task/input feature sets and a corresponding execution mode. Detail parameters of each mode can be stored in a table or array for future use. The learning process provides various preliminary execution mode selections for use in trial runs.

In block 330, an adaptive execution mode selection process is performed. The adaptive execution mode selection process is performed in part on-the-fly. A trial run is performed utilizing the preliminary execution mode selection results from block 320. Information regarding a trial run of a current program task (e.g., task feature definitions, input feature definitions, etc.) is gathered. The adaptive execution mode selection includes trial running of program tasks, real run execution mode selection based on trial run results, and initiating real running of the program tasks using results from real run adapted execution mode selection. Additional explanation of new adaptive execution mode selection approaches is set forth in later portions of the detailed description.

Figure 4:
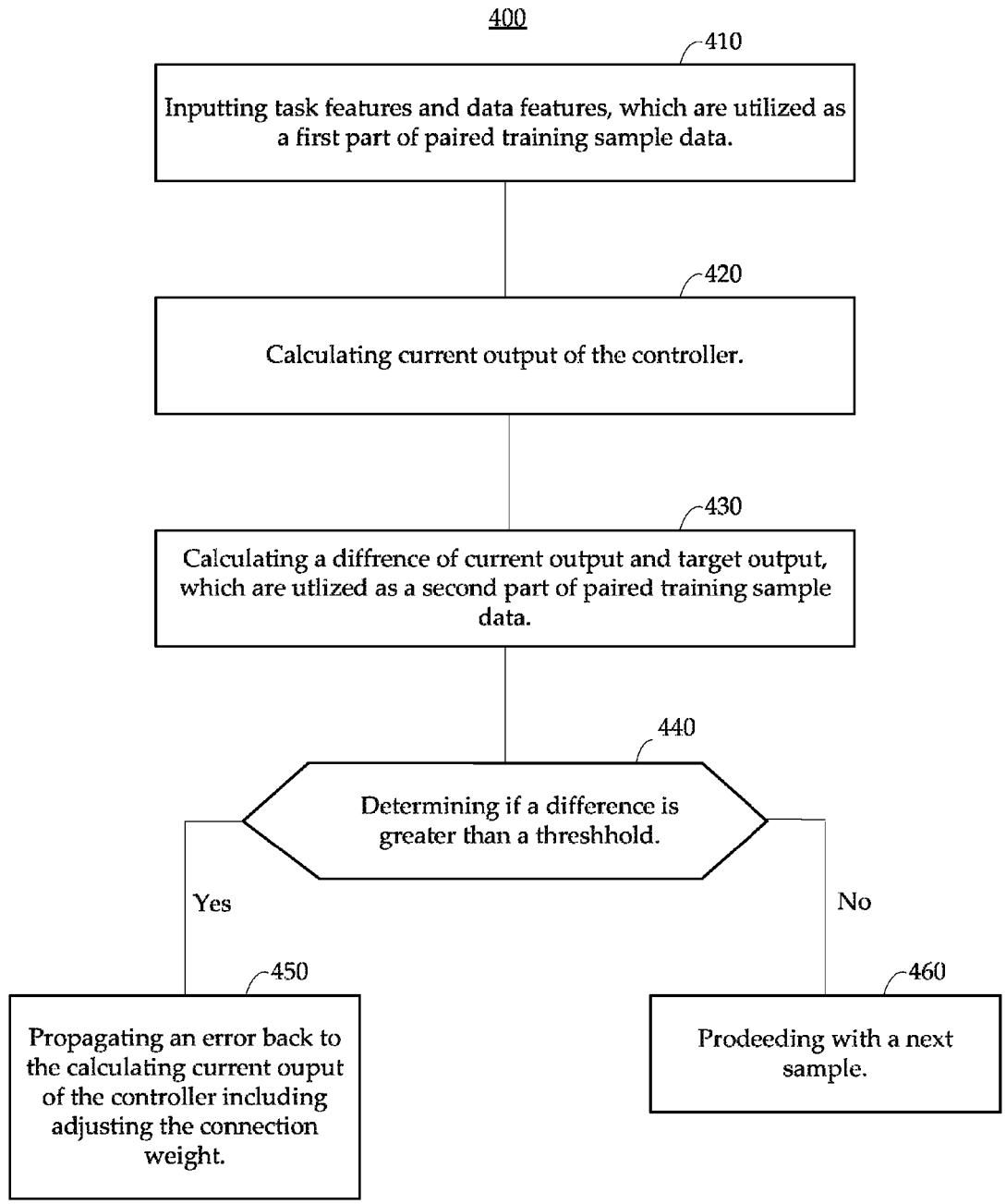
FIG. 4 is a flow chart of a guided machine learning process in accordance with one embodiment.

FIG. 4 is a flow diagram of a guided machine learning process 400 in accordance with one embodiment. Guided machine learning process 400 is analogous to the guided machine learning process in block 320. Guided machine learning process 400 is directed to training an execution mode selection process on associations of execution modes to definition characteristics.

In block 410, task feature definitions and input feature definitions are received.

In block 420, a current output of the controller is calculated.

In block 430, a difference of the current output and a target output are calculated. The difference is utilized as a second part of paired training sample data.

In block 440, a determination is made if the difference is greater than a threshold.

In block 450, an error-back is propagated to the process that calculates the current output of the controller (e.g., block 420) including adjusting the connection weight, if the difference is greater than the threshold.

In block 460, a next sample is processed if the difference is not greater than the threshold. This continues for samples from a first sample to a last sample associated with the task features and data features.

FIG. 5 is a flow chart of an adaptive selection process 500 in accordance with one embodiment. Adaptive selection process 500 is analogous to adaptive selection process in block 330. A system can have an adaptive selection mechanism that implements an adaptive selection process when running in real time. There are three major phases: trial running phase; solution selection phase; and real run phase.

In block 510, a trial version task is launched. The trial version can be launched when a system starts running.

In block 520, input data feature set definitions and task feature set definitions are collected from the trial version. The information can be collected after a certain period of time and input to a controller for use in adaptive current execution mode selection.

In block 530, an adapted execution mode selection solution is determined. In selecting one of the execution modes, collected features are input to the controller. Unlike the learning procedure, the selection procedure of the controller is feed-forward based and calculations are done in real time. The output of the controller is a mode selected under current system conditions.

In block 540, a selected execution mode is used to execute a process. A system can start running with a solution provided from the controller (e.g., either sequential or parallel). Parallel mode parameters can be retrieved from a table or array included in the artificial neural network controller design.

Figure 6:
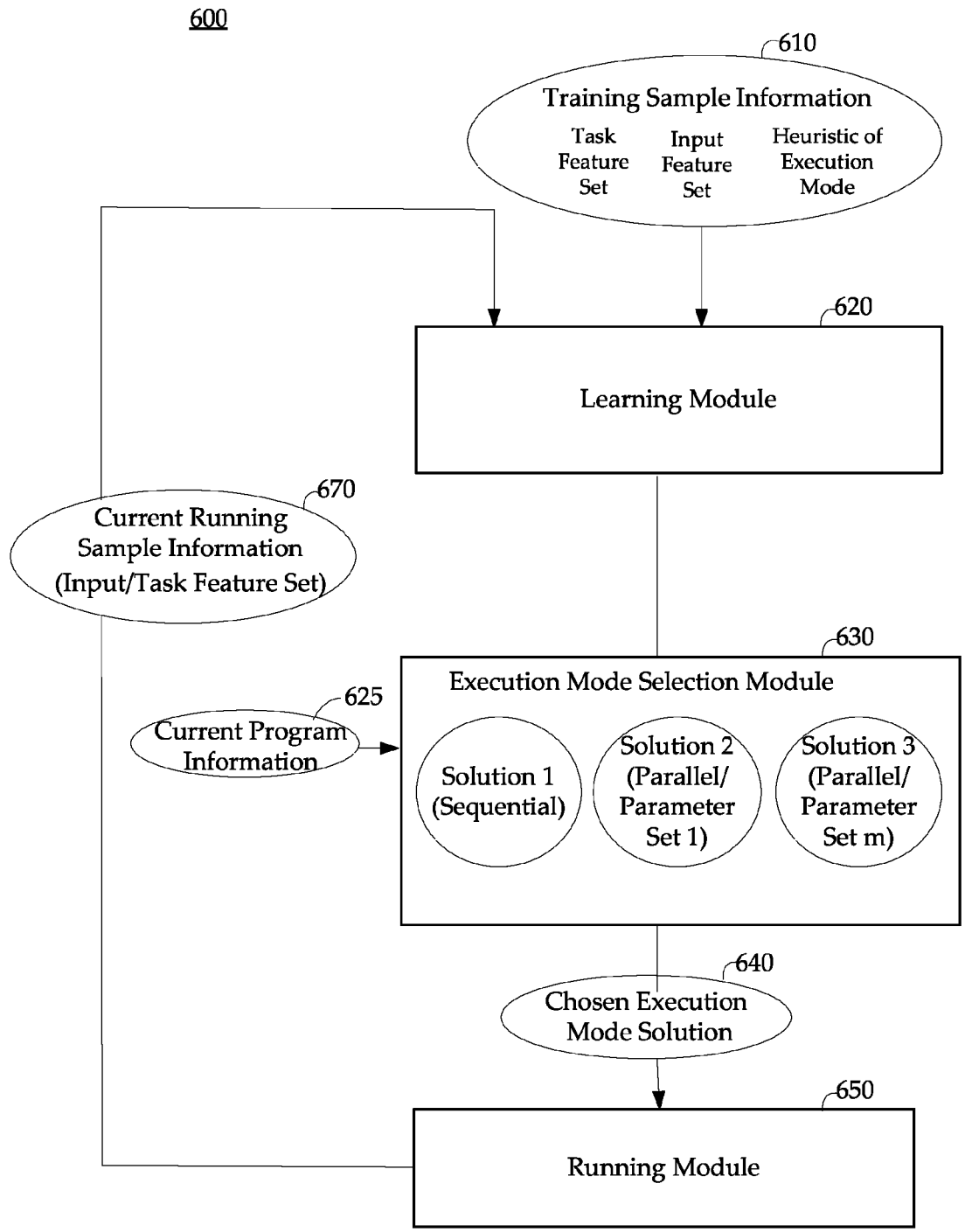
FIG. 6 is a block diagram of an exemplary system in accordance with one embodiment.

FIG. 6 is a block diagram of an exemplary system 600 in accordance with one embodiment. System 600 includes learning module 610, execution mode selection module 620, and running module 630. Learning module 610 receives training sample information 610. Training sample information 610 includes task feature set information, input feature set information and heuristic information for execution modes. Learning module 620 establishes a relationship between the heuristic information for execution modes to corresponding task feature set information and input feature set information. Information regarding the relationships is forwarded to execution mode selection module 630 which establishes solutions (e.g., solution 1, 2, and 3, etc.) based on the relationship information.

Current program information 625 (e.g., input and task features of the current program, etc.) is also input to execution mode selection module 630 and a choice of one the solutions is made. A designated "current" execution mode solution is forwarded to running module 650 which executes various tasks based upon the selected execution mode solutions. It is appreciated that different execution mode solutions can be selected for different portions of a current program. Current running sample information 670 including input feature and task feature information is forwarded to learning module 620. Learning module 620 can establish new (or amended) relationships between 1) the heuristic information for execution modes to corresponding task feature set information and 2) input feature set information. The new (or amended) relationship information can be used to modify current execution mode selection and also incorporated into future decisions.

Figure 7:
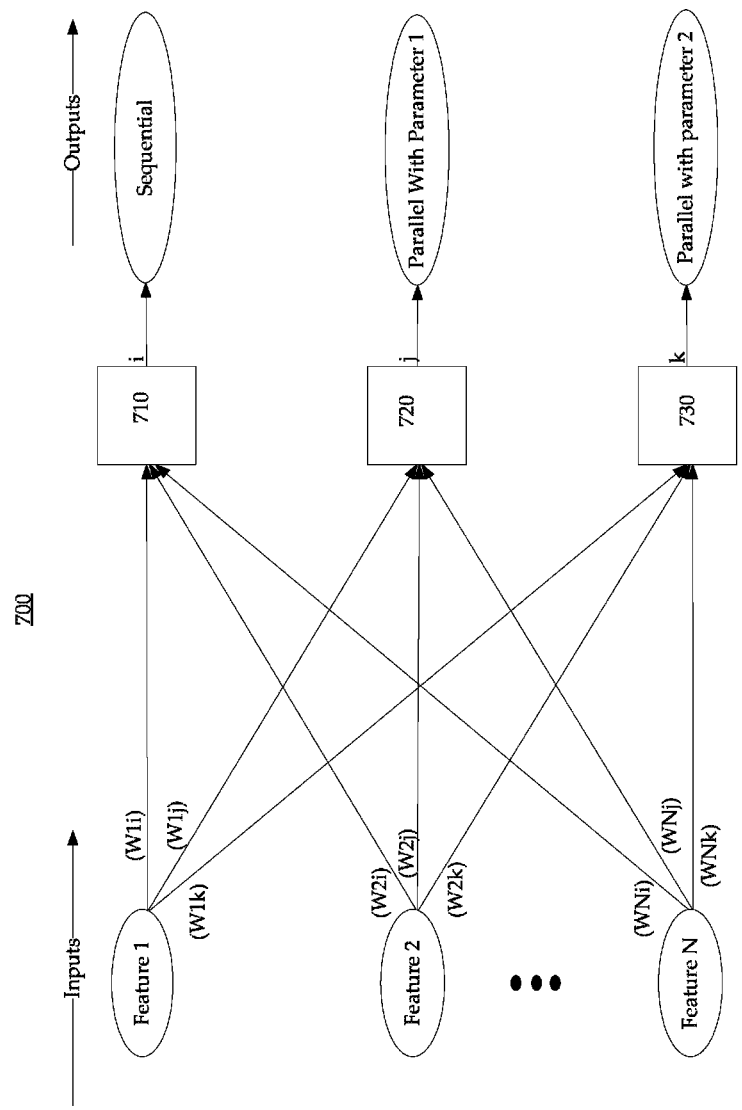
FIG. 7 is a block diagram of exemplary artificial neural network design in accordance with one embodiment.

FIG. 7 is a block diagram of exemplary artificial neural network design 700 in accordance with one embodiment. Artificial neural network design 700 includes various inputs and outputs. There can be multiple hidden layers (not shown) in between the inputs and outputs. Artificial neural network design 700 establishes relationships between various features and execution mode selections. There are several features (e.g., feature 1, feature 2, feature N, etc.) that are associated with the various execution modes (e.g., designated by i, j, k, etc.). In the present exemplary implementation, the various execution modes include, for instance, sequential, parallel with parameter set 1, and parallel with parameter set 2. The features are assigned weights (e.g., $W1i$, $W2j$, $Wni$, etc.) that are fed into computation components 710, 720 and 730 which establish a weighted correspondence between the characteristics of the features and the various execution modes.

Figure 8:
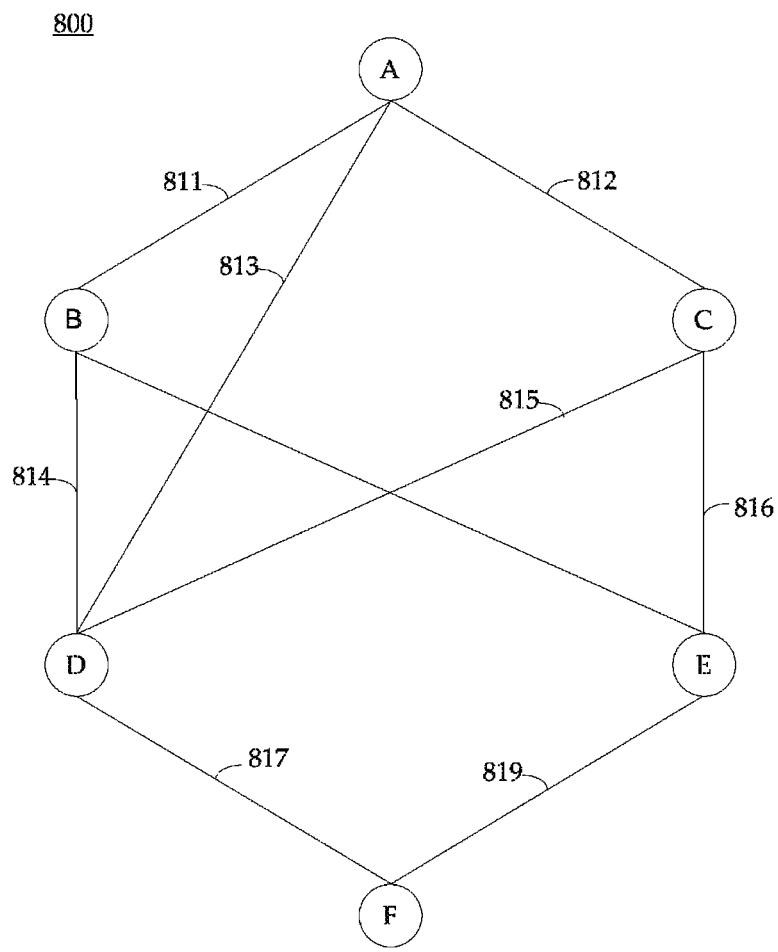
FIG. 8 is a graph illustration of an exemplary application in accordance with one embodiment.

It is appreciated that the new execution mode selections can be performed by a variety of program tasks (e.g., loop, graph, etc.). FIG. 8 is a graph illustration of an exemplary application 800 in accordance with one embodiment. Application 800 is a program that includes various nodes associated with processing tasks A, B, C, D, E and F that are coupled together in the graph representation by edges 811, 812, 813, 814, 815, 816, 817, and 819. The tasks or nodes are aware of a preceding task or node. In one embodiment, the application begins with processing associated with task A, and finishes with processing associated with task F. The application 800 includes various other process tasks (e.g., B, C, D, etc.) between task A and task F. The edges can represent various relationships between the tasks (e.g., input, output etc.) and assigned weights. A summation of the weighted edges in a path is performed to arrive at a total cost or impact of the path and a shortest path between A and F can be found. It is appreciated that the graph for an exemplary application can have a variety of different configurations with different numbers of nodes and edges.

The execution mode selection process can be used to select an execution mode for performing a program loop task. In one exemplary application the loop is based on the following program task:

```
M[2X4]
N[4X4]
for (i=1; i<10; i++)
    for (j=1; j<10; j++)
    {
    Kij=Mij + Nij;
    }.
``` where M and N are two dimensional arrays that are added together to produce the resulting two dimensional array K. In the above example, there is a total of 100 tasks or iterations to calculate the elements of K. The addition instruction for calculating each element of K is the same, but each operation or iteration uses different input data (from the M and N arrays). Thus, each addition task or operation can be executed in approximately the same amount of time. An execution mode selection is made based upon the number of inputs (e.g., from M and N) and the number of instructions (e.g., the addition function). If a parallel execution mode is selected, parameters associated with the parallel execution mode are also selected (e.g., the number of tasks to be executed at same time, etc.) based on system information at runtime (e.g., number of available CPU cores, amount of memory available, etc.).

It is appreciated that M, N and K are generic indicators that can have various different meanings in different application domains. For example, they can be matrices which include numerical values corresponding to pixels in an image (e.g., illumination values, texture map values, etc.). The index range can vary (e.g., 10×10, 1024×758, etc.) and can depend upon the application (e.g., values that correspond to the format or resolution of an image, etc.). It is also appreciated that a loop can include a number of different inputs and iterative instructions. In an alternative embodiment, a loop program task has more inputs than M[2×4] and N[4×4]; and more iterative instructions than Kij=Mij+Nij.

Figure 9:
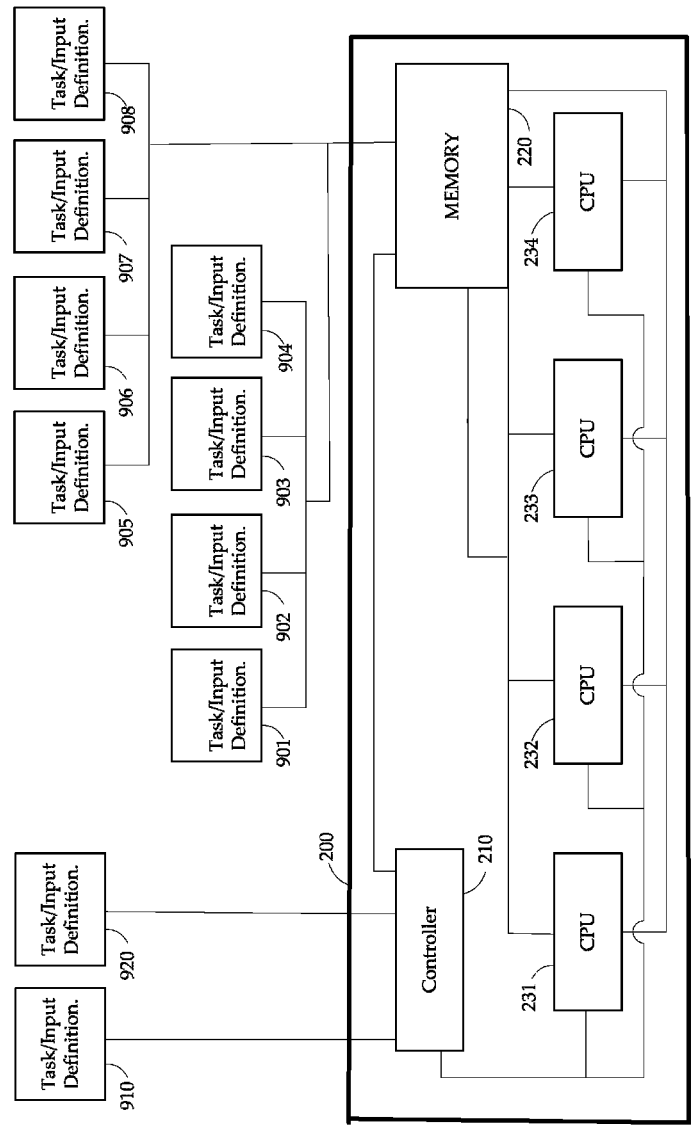
FIG. 9 is a block diagram of exemplary adaptive execution mode selection in accordance with one embodiment of the present invention.

FIG. 9 is a block diagram of exemplary adaptive execution mode selection in accordance with one embodiment of the present invention. Information 901, 902, 903, and 904 is received by system 200. The information includes information on task feature definitions, input feature definitions and the execution mode definitions used in historic execution of various program tasks. Program task 901 is a loop program task with few instructions and few inputs and is performed sequentially. Program task 902 is a loop program task with many instructions and many inputs and is performed in parallel. Program task 903 is a graph program task with few instructions and few inputs and is performed sequentially. Program task 904 is a graph program task with many instructions and many inputs and is performed in parallel. Program task 905 is a loop program task with few instructions and many inputs and is performed in parallel. Program task 906 is a loop program task with many instructions and a few of inputs and is performed sequentially. Program task 907 is a graph program task with few instructions and many inputs and is performed in parallel. Program task 908 is a graph program task with many instructions and a few of inputs sequentially.

Controller 210 performs a learning operation and produces the following pairing of sample definition features and corresponding execution mode selection results.

| Samples | Solution Mode Selection |
|---|---|
| Few Instructions/Few Inputs | Sequential |
| Many Instructions/Many Inputs | Parallel |
| Many Instructions/Few Inputs | Parallel |
| Few Instructions/Many Inputs | Sequential |

Controller 210 receives task feature and input feature information 910 which is associated with a first task. Task feature and input feature information 910 indicates the first task includes relatively few inputs and few instructions. Utilizing the above mapping, controller 210 selects a sequential execution mode as a preliminary execution mode. A trial run of the first task is executed sequentially using CPU 231 and additional current task feature and input feature information is collected. Controller 210 performs an adapted execution mode selection and continues to use the sequential execution mode as an adapted execution mode if the trial run indicates the sequential mode selection is proper. The controller makes a change to another execution mode if the sequential execution mode is not performing appropriately based upon the trial run.

Controller 210 receives task feature and input feature information 920 which is associated with a second task. Task feature and input feature information 920 indicates the second task includes relatively few inputs and few instructions. Utilizing the above mapping, controller 210 selects a sequential execution mode as a preliminary execution mode. A trial run of the second task is executed in parallel using CPUs 232 and 233 and additional current task feature and input feature information is collected. Controller 210 performs an adapted execution mode selection and continues to use the parallel execution mode as an adapted execution mode if the trial run indicates the parallel mode selection is proper. The controller makes a change to another execution mode if the parallel execution mode is not performing appropriately based upon the trial run.

Embodiments described herein may be discussed in the general context of computer-executable instructions, such as program modules, residing on some form of computer-readable storage medium executed by one or more computers or other devices. By way of example, and not limitation, computer-readable storage media may comprise non-transitory computer-readable storage media. Non-transitory computer-readable storage media includes all computer-readable media except for a transitory, propagating signal. Computer-readable storage media includes volatile and nonvolatile, removable and non-removable media implemented in any method or technology for storage of information such as computer-readable instructions, data structures, program modules or other data. Generally, program modules include routines, programs, objects, components, data structures, etc., that perform particular tasks or implement particular abstract data types. The functionality of the program modules may be combined or distributed as desired in various embodiments.

Although certain embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A system comprising:
a plurality of central processing units;
a memory; and
a controller, embedded in a processing component, the controller coupled to the memory and coupled to the plurality of central processing units, wherein the controller is operable to direct selection of a sequential execution mode or one of a plurality of parallel execution modes with respect to said plurality of central processing units, wherein the controller is further operable to:
generate respective definition characteristics for each task of a plurality of tasks, each definition characteristic comprising a task feature set including, for each respective task, at least one of: a number of instructions in the task, a number of task parameters associated with the task, a time of execution of the task, an amount of memory usage by the task, and a number of instructions in the respective task; and an input feature set including, for each respective task, at least one of: a number of inputs to the task, a size of an input to the task, a type of an input to the task, and a dimension of input data to the task;
establish a plurality of definition pairs that map the definition characteristics to execution modes using a neural network trained by supervised machine learning based training, and
responsive to the generated definition characteristics for each task, execute adaptive selection of the execution mode to be used by the central processing units for each task on-the-fly while the central processing units are running the tasks.

2. The system of claim 1, wherein the definition operations further include collecting information related to respective heuristics associated with the execution mode selections, the heuristics including a summation of weighted correspondence among the task feature sets, input feature sets, and the execution modes.

3. The system of claim 2, wherein each of the task feature sets further includes a set of data collected from previous runs of other tasks and a present characteristic of a current task.

4. The system of claim 3, wherein the set of data collected from the previous runs of the other tasks includes, for each task of the other tasks, at least one feature selected from: a number of instructions of the task; a number of task parameters; a time of execution for the task; and a memory usage of the task.

5. The system of claim 2, wherein each of the input feature sets includes a set of data describing characteristics of a current input.

6. The system of claim 5, wherein each of the input feature sets includes at least one of: an input length; an input type; and a dimension of input data.

7. The system of claim 2, wherein the heuristics associated with each execution mode include a set of process steps that selects an execution mode for one of the tasks.

8. The system of claim 2, wherein a portion of the information is collected as training samples from historical runs of tasks that are similar to the plurality of tasks.

9. The system of claim 1 wherein execution mode selection includes selecting from among the sequential execution mode and the plurality of parallel execution modes with respectively different parameters each of the respectively different parameters including a number of tasks to be executed at a time.

10. A method executed by a controller, said method comprising:
gathering, by the controller, information related to a plurality of central processing units controlled by said controller;
associating, by the controller, a plurality of definition characteristics with a respective plurality of tasks to define respective execution modes for the plurality of tasks by performing training including performing supervised machine learning, wherein each definition characteristic includes, for each respective task, at least one of: a number of instructions in the task, a number of task parameters associated with the task, a time of execution of the task, an amount of memory usage by the task, a number of inputs to the task, a size of an input to the task, a type of an input to the task, and a dimension of input data to the task; and the execution modes include a sequential execution mode and a plurality of parallel execution modes;
performing, by the controller, adaptive selection of an execution mode for each task from among the execution modes, wherein said adaptive selection is performed on-the-fly responsive to the definition characteristics; and
causing, by the controller, the plurality of central processing units to execute the plurality of tasks utilizing the selected execution modes.

11. The method of claim 10 wherein the supervised machine learning includes:
inputting task features and input data features, the input data features including the number of inputs for the task to provide a first part of paired training sample data;
calculating a current controller output;
calculating a difference between the current controller output and a target controller output, to provide the difference as a second part of the paired training sample data; and
upon determining that the calculated difference is greater than a threshold, propagating an error back to the calculating of the current controller output, otherwise proceeding with a next paired training sample data.

12. The method of claim 11, wherein the proceeding with the next paired training sample data is performed for input sample data from a first input sample set to a last-input sample set associated with the task features and input data features.

13. The method of claim 10, wherein the performing adaptive selection of an execution mode includes:

launching a trial version of one of the plurality of tasks using a predetermined execution mode and collecting features therefrom;

selecting one of the execution modes in a feed forward procedure responsive to calculations based on the collected features from the trial version of the one task; and initiating execution of the one task using the selected execution modes.

14. The method of claim 10, wherein said gathering of the information includes gathering information associated with heuristics associated with the execution mode selection, the heuristics including a summation of weighted correspondence among task feature sets, input feature sets, and the execution modes.

15. The method of claim 10, wherein:

the definition characteristics further include information associated with at least one feature selected from a number of task parameters, a time of execution, and a memory usage measure and information associated with at least one feature selected from: an input length, an input type, and a dimension of an input data item.

16. A system comprising:

a controller;

a learning module which configures the controller to receive a plurality of definition characteristics for a respective plurality of tasks, each definition characteristic comprising a task feature set including, for each respective task, at least one of: a number of instructions in the task, a number of task parameters associated with the task, a time of execution of the task, and an amount of memory usage by the task; and an input feature set including, for each respective task, at least one of: a number of inputs to the task, a size of an input to the task, a type of an input to the task, and a dimension of input data to the task;

an execution module which configures the controller to run trials of the respective tasks using a predetermined execution mode and to select respective execution modes of a plurality of execution modes to be used for the tasks running on a plurality of central processing units, wherein the execution module is further configured to adapt the selected execution mode on-the-fly, while running the task, using an artificial neural network, wherein the plurality of execution modes includes a sequential execution mode and a plurality of parallel execution modes, the plurality of parallel execution modes having respectively different parameters each of the respectively different parameter including a number of tasks to be executed at a time; and a running module coupled to the execution module, the running module configuring the controller to initiate running each of the plurality of tasks on the plurality of central processing units based upon the respective execution mode selected and adapted by the controller responsive to the execution module.

17. The system of claim 16, wherein the controller is further configured by the learning module to establish a relationship between heuristics associated with execution mode selections and corresponding ones of the task feature sets and the input feature sets, the heuristics including a summation of weighted correspondence among the task feature sets, input feature sets, and the execution modes, and wherein the controller is further configured by the learning module to forward information regarding the relationship to the execution module, wherein the execution module further configures the controller to establish execution mode solutions based on the information.

18. The system of claim 17, wherein the information includes task feature sets, input feature sets, and heuristics associated with respective ones of the execution mode selections, the heuristics including a summation of weighted correspondence among the task feature sets, input feature sets, and the execution modes.

19. The system of claim 16, wherein the execution module further configures the controller to select different execution mode solutions for different portions of a current program.

20. The system of claim 16, wherein the learning module further configures the controller to establish an amended relationship between heuristic information and input feature set information, the heuristic information including a summation of weighted correspondence among the task feature sets, input feature sets, and the execution modes, and wherein further the amended relationship is used to modify a selected execution mode.

* * * * *

UNITED STATES PATENT AND TRADEMARK OFFICE
CERTIFICATE OF CORRECTION

PATENT NO. : 9,939,792 B2
APPLICATION NO. : 14/585738
DATED : April 10, 2018
INVENTOR(S) : Chen et al.

Page 1 of 1

It is certified that error appears in the above-identified patent and that said Letters Patent is hereby corrected as shown below:

On the Title Page

In item (71), in "Applicant", in Column 1, Line 1, after "Technologies", insert --,--

In the Drawings

On sheet 4 of 9, Fig. 4, reference numeral 430, Line 1, delete "diffrence" and insert --difference--, therefor On sheet 4 of 9, Fig. 4, reference numeral 430, Line 2, delete "utlized" and insert --utilized--, therefor On sheet 4 of 9, Fig. 4, reference numeral 440, Line 2, delete "threshhold." and insert --treshold.--, therefor On sheet 4 of 9, Fig. 4, reference numeral 450, Line 2, delete "ouput" and insert --output--, therefor On sheet 4 of 9, Fig. 4, reference numeral 460, Line 1, delete "prodeeding" and insert --proceeding--, therefor In the Specification In Column 6, Line 22, delete "610," and insert --620,--, therefor In Column 6, Line 22, delete "620," and insert --630,--, therefor In Column 6, Line 23, delete "630." and insert --650.--, therefor In Column 6, Line 23, delete "610" and insert --620--, therefor In Column 6, Line 64, delete "Wni," and insert --WNi,--, therefor Signed and Sealed this
Eighteenth Day of June, 2019

Andrei Iancu
*Director of the United States Patent and Trademark Office*